J. C. Millward,
Ornamenting Glass.
Nº 70,240.        Patented Oct. 29, 1867.
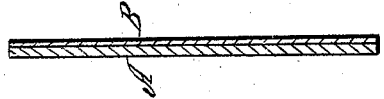
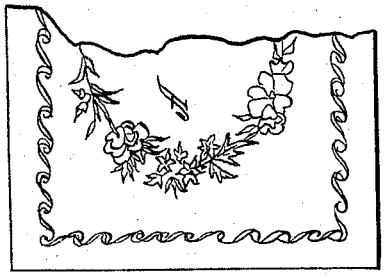
Witnesses:        Inventor:

United States Patent Office.

JOHN C. MILLWARD, OF NEW YORK, N. Y.

Letters Patent No. 70,240, dated October 29, 1867.

IMPROVEMENT IN ORNAMENTING GLASS.

The Schedule referred to in these Letters Patent and making part of the same.

TO ALL WHOM IT MAY CONCERN:

Be it known that I, JOHN C. MILLWARD, of the city, county, and State of New York, have invented a new Improvement in Stained Glass; and I do hereby declare that the following is a full, clear, and exact description thereof, which will enable others skilled in the art to make and use the same, reference being had to the accompanying drawings, forming a part of this specification, in which—

Figure 1 is a plan or top view of my invention.

Figure 2 is a cross-section of the same.

This invention relates to a very simple device whereby stained or painted glass may be made to appear as if pearl-work were laid underneath it.

The invention consists in laying a piece of crystallized sheet zinc under or behind a piece of stained or painted glass, whereby the glass will not only be considerably strengthened, but whereby those portions of the glass which are left transparent will look as if they were inlaid with pearl. Glass plates thus ornamented may be used on fancy boxes and other devices. The zinc or other crystallized sheet-metal plate is very cheap, and consequently such boxes or work can be produced at a very low price, while it can only be distinguished from real work by very close scrutiny.

In the drawing, the glass plate A is laid upon a crystallized metal plate, B, whereby the aforesaid effect is produced upon those portions of the glass which are left transparent.

Having thus described my invention, what I claim as new, and desire to secure by Letters Patent, is—

The application of the crystallized sheet-metal plate B to the under side of the glass, against the paint or staining, as herein described, for the purpose specified.

J. C. MILLWARD.

Witnesses:
WM. F. McNAMARA,
ALEX. F. ROBERTS.